(12) United States Patent
van Ruymbeke et al.

(10) Patent No.: US 9,825,779 B2
(45) Date of Patent: Nov. 21, 2017

(54) NETWORK-ON-CHIP (NOC) TOPOLOGY GENERATION

(71) Applicant: Arteris, Inc, Campbell, CA (US)

(72) Inventors: Xavier van Ruymbeke, Issy les Moulineaux (FR); Monica Tang, San Jose, CA (US); Jonah Probell, Alviso, CA (US); Aliaksei Chapyzhenka, San Jose, CA (US)

(73) Assignee: ARTERIS, Inc., Campbell, CA (US)

( * ) Notice: Subject to any disclaimer, the term of this patent is extended or adjusted under 35 U.S.C. 154(b) by 41 days.

(21) Appl. No.: 14/722,046

(22) Filed: May 26, 2015

(65) Prior Publication Data
US 2015/0341224 A1   Nov. 26, 2015

Related U.S. Application Data

(60) Provisional application No. 62/002,785, filed on May 23, 2014.

(51) Int. Cl.
  *G06F 17/50* (2006.01)
  *H04L 12/54* (2013.01)
  *H04L 12/933* (2013.01)

(52) U.S. Cl.
  CPC .......... *H04L 12/56* (2013.01); *G06F 17/5045* (2013.01); *H04L 12/54* (2013.01); *H04L 49/109* (2013.01)

(58) Field of Classification Search
  CPC .. G06F 17/5077; G06F 17/505; G06F 17/509; G06F 2217/04; G06F 2217/84
  See application file for complete search history.

(56) References Cited

U.S. PATENT DOCUMENTS

| 8,601,423 | B1 | 12/2013 | Philip et al. | |
| 8,819,611 | B2* | 8/2014 | Philip | G06F 17/5072 703/16 |
| 2013/0148506 | A1* | 6/2013 | Lea | H04L 47/32 370/236 |
| 2015/0178435 | A1* | 6/2015 | Kumar | G06F 17/505 716/114 |

OTHER PUBLICATIONS

Rabinovich, Andrew CSE 252C: Chierarchical Clustering: An iterative improvement procedure for hierarchical clustering http://seweb.ucsd.edu/classes/fa04/cse252c/amrabino.pdf Oct. 12, 2004.
Abbasi, Ameer Ahmed; and Younis, Mohamed A survey on clustering algorithms for wireless sensor networks Elsevier, Computer communications, ScienceDirect, Computer Communications 30 (2007) 2826-2841 Jun. 21, 2007.
Kumar, Sailesh; Mohandass, Anush; Mitra, Sundari; and Rowlands, Joe NetSpeed eNoC—a Quantum Leap in On-Chip Interconnect Design HotChips conference Aug. 26, 2013.

* cited by examiner

*Primary Examiner* — Alvin Zhu

(57) ABSTRACT

A system and method of defining the topology of a network-on-chip. The IP sockets and their data transfer connectivity are defined. The location of each IP socket is defined. A number of switches are defined so that there is at least one switch within a distance from each IP socket, the distance being less than that over which a signal propagates within one clock cycle period. The switches are coupled by links. Links may comprise pipeline stages, storage buffers, and are characterized by a data width.

14 Claims, 14 Drawing Sheets

NETWORK-ON-CHIP (NOC) TOPOLOGY GENERATION

CROSS REFERENCE TO RELATED APPLICATION

This application claims priority under 35 USC 119 from U.S. Provisional Application Ser. No. 62/002,785 titled NoC TOPOLOGY GENERATION filed on May 23, 2014 by Xavier VAN RUYMBEKE et al., the entire disclosure of which is incorporated herein by reference.

FIELD OF THE INVENTION

The invention is in the field of semiconductor chip design and, more particularly, the design of network-on-chip topologies.

BACKGROUND

Wire routing congestion is a primary limitation on the design of a network-on-chip (NoC). Chips can have hundreds of semiconductor intellectual property (IP) cores connected through the network. The locations of IP-NoC interface sockets are generally fixed or constrained to certain regions. With a high degree of data transfer connectivity between IPs, a tremendous number of wires must be routed within the hallways between blockages in the floorplan of a chip. Routing such large numbers of wires requires a lot of manual work in the back end of the chip design process. If routing cannot be achieved successfully then changes are necessitated at the front end, and that adds significant delay to completing the chip design.

Routing is a process that, conventionally, is done in the back end part of a chip design project without any particular planning in the front end part. Logic design, and particularly higher-level design such as NoC topologies used to generate logic, creates problems for the back-end design engineers to solve in every project. This unpredictably delays the completion of chip designs headed for manufacturing.

The place & route problem can be reduced by dividing the NoC into a set of switches connected by links. Each switch aggregates the traffic of one or more logically upstream ports and one or more logically downstream ports. Links between switches thereby carry the network traffic of multiple IPs on a single set of wires. The full data transfer connectivity of the NoC is still available, just in a way that shares wires in order to reduce routing congestion. However, an optimal topology of switches and links is far from obvious.

Another problem is closing timing. Throughout the history of generations of chip design technologies, the sizes of chips have remained fairly constant, the clock cycle periods have decreased, and the propagation delay of signals on wires has increased. That means that it takes more than one and in some cases many cycles for information to propagate from one IP to another.

To accommodate this reality, pipeline stages are used within switches and on links in NoC designs. Pipeline stages within switches are expensive because they usually must be replicated for multiple ports within the switch. Since the length of links can vary, the number of pipeline stages required on links between switches to close timing can be from zero to many. The topology of switches and links should ideally be designed in order to minimize the number of pipeline stages. How many pipeline stages to place, and how to design the topology with them in mind, is far from obvious. Therefore, what is needed is a method and system for designing a near-optimal NoC topology of localized switches connected by pipelined links.

SUMMARY OF THE INVENTION

The disclosed invention includes a novel method for designing a near-optimal network-on-chip (NoC) topology of physically localized switches connected by optionally-pipelined links, as well as a stored computer program for carrying out the method. The disclosed invention further includes a network-on-chip with a near-optimal topology, the network-on-chip potentially comprising switches with more than one IP socket connection and more than four connections to other switches, as well as stored hardware description language code describing such a network-on-chip.

The method and network-on-chip, according to the invention, provide data transfer connectivity for a plurality of IP sockets. The location of sockets is used to determine the interconnectivity of switches, which is determined in order to ensure that clock speed can be met and chip design timing closure achieved by each socket being connected to a switch that is within the distance that a signal can travel within the period of one clock cycle. Sockets are coupled to switches and switches to each other along links that can comprise pipeline stages, to enable timing closure, storage buffering, to improve performance with bursty data transfer traffic. Links can also have different data widths to accommodate the different amounts of bandwidth needed between particular switches in the NoC.

NoC topologies according to the invention can, but need not, comprise 2D meshes or depleted 2D meshes. NoC topologies according to the invention can, but need not, be implemented with the locations of switches or the locations of IP sockets on a virtual reference grid. NoC switches according to the invention can have any number of socket couplings and any number of couplings with other switches.

DETAILED DESCRIPTION

Figure 1:
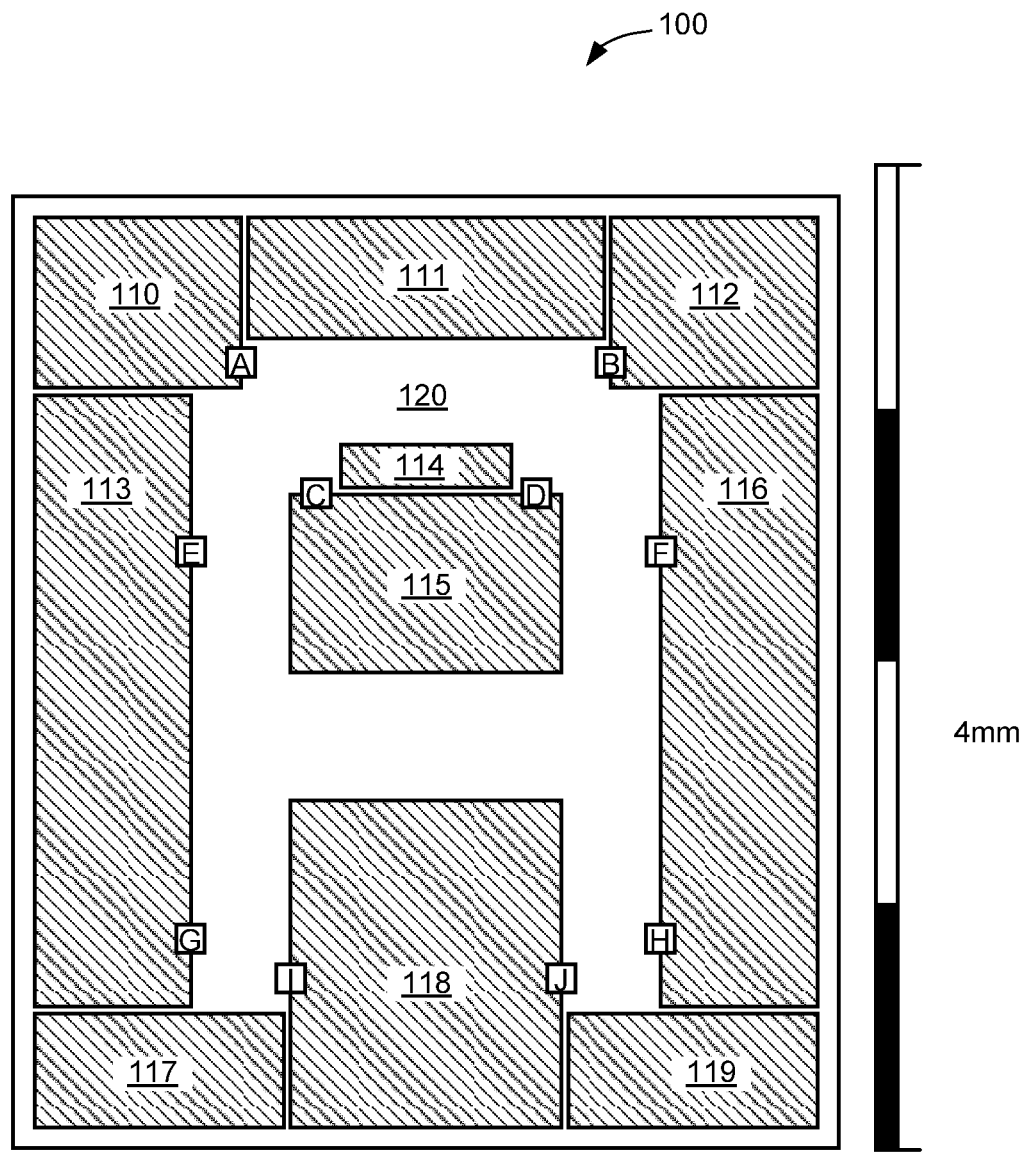
FIG. 1 shows a chip floorplan with socket locations in accordance with various aspects of the invention.

According to an aspect of the invention, the data transfer connectivity of a network-on-chip, between senders and receivers, is decomposed into multiple switches, connected by links in a specific topology. With respect to a switch, each port can be connected to the socket interface of an IP or to a link. Switches can be arranged in regular topologies such as rings, meshes, tori, and Clos networks or can be complex or irregular.

Each switch, including its logic and internal wiring is physically localized. This will tend to occur naturally by place & route algorithms, but can also be assured by specifying regions within a floorplan constraint file, such as a design exchange format (DEF) file. The localization of the logic of switches ensures that their signal propagation time is within one clock cycle period.

If the data transfer connectivity of IPs within a chip changes, or if the location of a socket changes, or if the place and route congestion requires the location of switch logic to change, then according to an aspect of the invention, ports may be moved from one switch to another to support the same effective data transfer connectivity. Alternatively, a regeneration of the global network topology may be calculated.

Links are physically embodied within chips as wires between the logic gates of switches. They can comprise functionality, such as firewalls or probes, but also provide for the propagation of signals over long distances. This can include the presence of buffers and inverters.

According to an aspect of the invention, pipeline stages are placed within links. Such pipeline stages break combinatorial paths between the logic of multiple switches. Pipeline stages are placed on links whose wires span a distance that is far relative to the time that it takes for a transistor to overcome the capacitance of the wire within the period of one clock cycle. A very rough rule of thumb is that it takes one nanosecond to switch a typical amount of logic along one millimeter of wire in a chip. Therefore, in an embodiment of a chip with a combinatorial logic path between flip-flops switching in two different switches that are 1.5 millimeters apart, the flip-flops switching with a 1 ns clock period (1 GHz clock frequency), a pipeline stage would be placed on the link. In an embodiment of such a chip with the two switches just 0.5 millimeters apart, no pipeline stage is needed. If switches are between two and three clock cycle periods apart then two pipeline stages are inserted in series within the link. In general, the number of pipeline stages are inserted within a link corresponding to the number of clock cycle periods that it would take for a signal to propagate the distance between switches.

According to an aspect of the invention, the full data transfer connectivity of the NoC is decomposed into smaller switches, such that a place & route tool would likely place the logic of each switch within a span less than the distance that a signal can propagate within one clock cycle period, minus some timing margin. In some embodiments of the invention this is accomplished by:

1. Defining regions, all points of which are within a particular distance in a floorplan, each region surrounding a number of IP sockets.

2. Decomposing the switch topology to implement a switch between some or all of the sockets within the region and one or more links to other switches or sockets that are outside of the region.

According to different aspects and embodiments of the invention, regions may take shapes such as circular, elliptical, rectilinear, diamond (a circle in Manhattan coordinates), or hexagonal or octagonal (elliptical in Manhattan coordinates). According to different aspects and embodiments, regions may surround portions of blockages or may be restricted to only areas where the NoC may be placed and routed. According to different aspects and embodiments, regions may overlap or be restricted from overlapping. According to different aspects and embodiments, regions may abut each other or may be drawn with space in between.

Faster clocks, which are ones with shorter clock cycle periods, have smaller regions and therefore tend to require decomposing the NoC topology into a larger number of smaller switches. According to an aspect of the invention, topologies should be decomposed in such a way as to tend to put the largest amount of logic in the slowest possible clock domain. Providing enough throughput for the communication requirements of IPs requires wider data paths in a slower clock domain, but the cost of the extra datapath logic is justified for many topologies by the fact that place & route tools have more freedom to spread the logic within a larger area. Defining the topology as such may give better place & route results.

Some chips have multiple networks. Some chips have separate networks for requests going from initiator IPs to target IPs and responses going from target IPs to initiator IPs. Some chips have out of band networks and include service, observation, distributed virtual memory, and quality-of-service networks. Some chips have multiple network layers, in order to serve traffic with different quality-of-service requirements.

The topology of the NoC can significantly affect the performance of a chip. Simulation tools and algorithmic calculation methods can be used to analyze the performance impact of a NoC topology. In particular, performance encompasses throughput and latency. According to an aspect of the invention, the performance of a NoC is analyzed. Based on the results the topology is modified. This involves, for example, configuring the data width of a link to provide sufficient throughput with minimal wires. Another example of a modification to a NoC topology is to insert a FIFO storage buffer within a link to avoid backpressure from blocking a route, or adding a rate adapter storage buffer to prevent bubbles from flowing downstream. Another example of a modification to a NoC topology is to remove a route from a switch if arbitration or other logic within the switch adds intolerable latency.

The various aspects of the invention can be carried out in many ways. To improve clarity for a design engineer, according to an embodiment of the invention, a boundary is drawn around the region with a distinguishing color and the switch, as well as the units within the switch, are given a matching color. This allows the topology to be viewed and optimized logically and mapped back and forth to a view representing physical locations. According to some embodiments of the invention, a hardware description language module is defined for each region. Each switch of each region is placed into the module of the region. According to some aspects and embodiments, exactly one switch is placed in each module, exclusive of any other logic.

The invention can be realized in a wide variety of ways. The figures and description disclosed herein are illustrative of only a small range of possible embodiments of the invention. The invention can be practiced on a reference grid or implemented in a continuous space. The invention can be practiced in a Euclidian coordinate system or a Manhattan coordinate system.

Referring now to FIG. 1, a chip floorplan 100 is shown. It is approximately 3 millimeters by 4 millimeters. Floorplan 100 has 10 obstructions, 110-119, representing blockages over which NoC logic may not be routed. The space between the blockages forms a routing channel 120. Floorplan 100 has 10 sockets, labeled A through J, shown in their respective locations within the floorplan 100.

Figure 2:
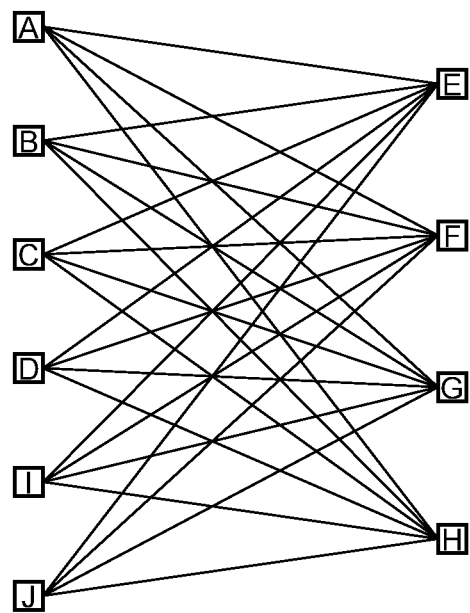
FIG. 2 shows data transfer connectivity between initiator and target sockets in accordance with various aspects of the invention.

In accordance with various aspects of the invention, sockets A, B, C, D, I, and J are associated with initiator IPs, and sockets E, F, G, and H are associated with target IPs. Referring to FIG. 2, the data transfer connectivity between the sockets is shown.

Figure 3:
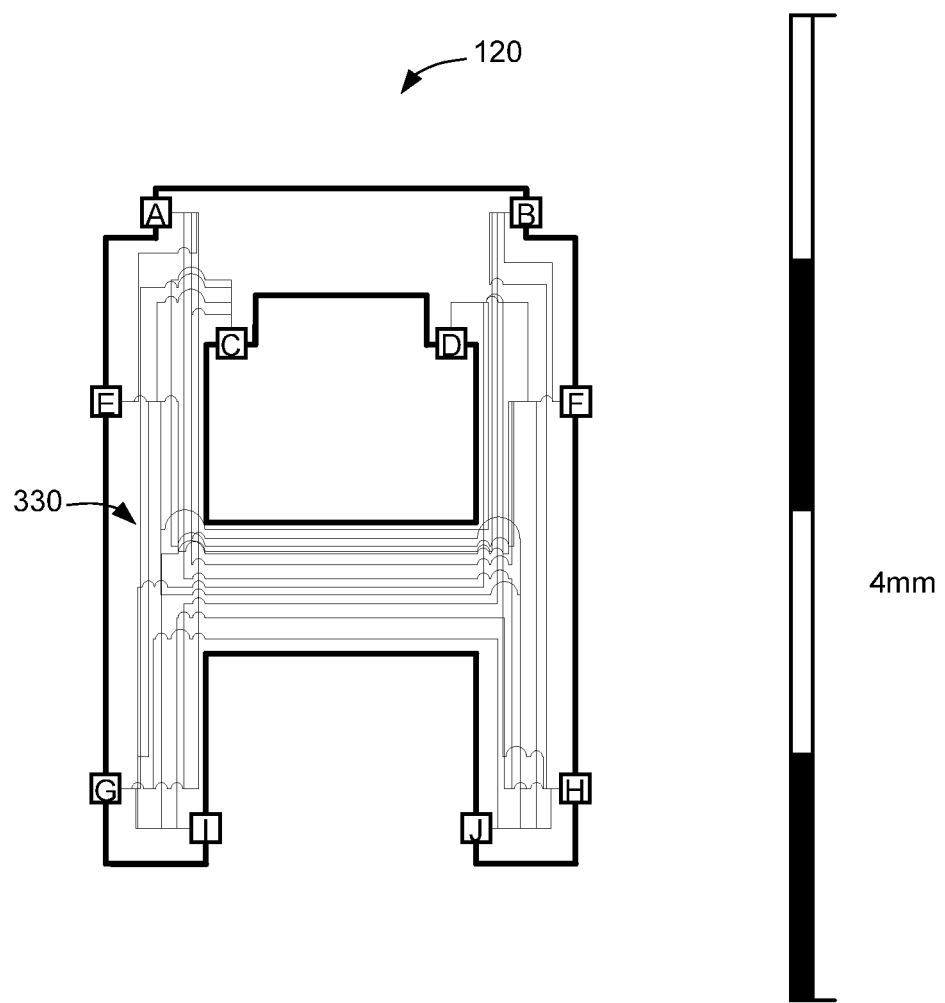
FIG. 3 shows the data transfer connectivity of a NoC within a routable area of a chip floorplan in accordance with various aspects of the invention.

Referring now to FIG. 3, the routing channel 120 is shown with physical wiring 330 that implements the data transfer connectivity of FIG. 2.

Figure 4:
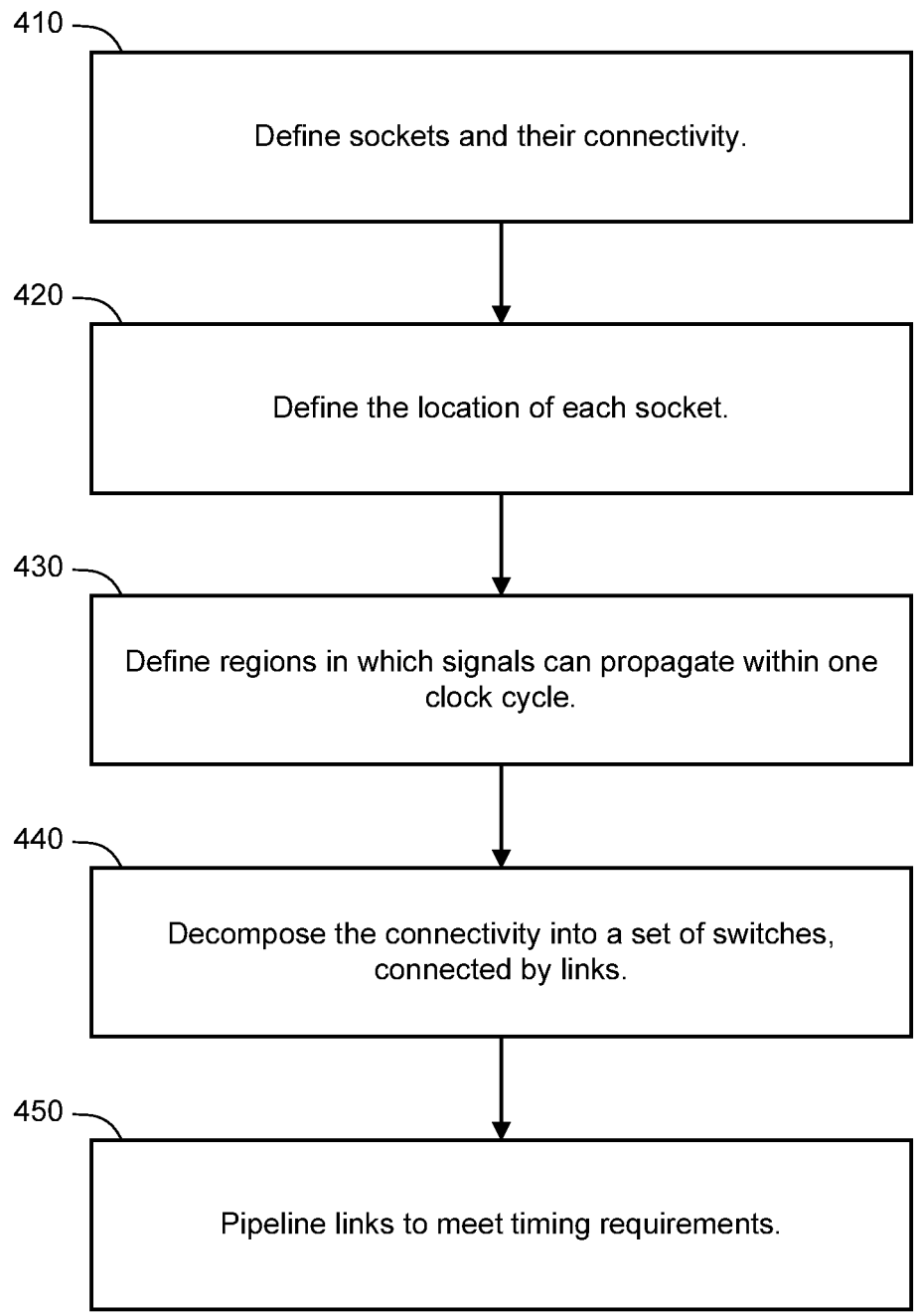
FIG. 4 shows the steps of an embodiment of NoC topology generation locations in accordance with various aspects of the invention.

Referring now to FIG. 4, a process flow is depicted in accordance with the aspects and an embodiment of the invention. In step 410 the sockets of the NoC and their data transfer connectivity are defined. This includes uniquely identifying each socket, such as by giving it a distinct name. The data transfer connectivity indicates all others with which each socket can communicate. Typical sockets are connected to either initiators or targets. In accordance with various aspects of the invention, initiators are connected to a number of targets but no other initiators and targets are connected to a number of initiators but no other targets. At step 420, the physical location of each socket is defined. In accordance with some aspects as set forth in some embodiments, the location is in a global frame of reference such as a chip floorplan. In accordance with other aspects as set forth in other embodiments, the location is defined relative to the location of one or more other sockets. In some embodiments locations are in two dimensions. In other embodiments locations are in three dimensions, such as would correspond to stacked silicon dies or different metal layers on a single die. In some embodiments locations are specified with continuous Cartesian coordinates. In some embodiments locations are specified on a finite reference grid.

At step 430 regions are defined. In an embodiment that uses DEF file floorplan descriptions, regions as described herein might or might not correspond to areas defined by region elements in the DEF file syntax. A first set of regions is defined around one or more socket locations. The region is chosen such that signals propagate across it within less than one clock cycle period. The amount less is a margin. The margin accommodates the delay for logic gates to switch values, delay due to vias between metal layers, and variability in switching and propagation times due to the manufacturing process, among other sources of delay. According to an aspect of one embodiment, a second such region is defined around one or more other socket locations exclusive of the ones in the first region. The process is repeated until all sockets are surrounded by at least one region. Some embodiments, in accordance with some aspects of the invention, do not require exclusivity of sockets within regions.

In accordance with some aspects of the invention and different embodiments, regions are regular, such as diamonds or circles. In accordance with some aspects of the invention and different embodiments, regions are irregular either rectilinearly, by segments, or on a continuum. In accordance with some aspects of the invention and some embodiments regions are two dimensional. In accordance with some aspects of the invention and in other embodiments regions are three dimensional. The invention can be practiced with any means of definition of regions and any type of regions defined and the scope of the invention is not limited thereby.

At step 440 the data transfer connectivity is decomposed into switches within regions. In accordance with some aspects of the invention, all sockets within each region are connected through a switch. Initiators are connected to targets according to their data transfer connectivity. Each switch is connected to a link for receiving upstream information from each other switch that has connectivity to a target socket or other downstream link. Each switch is also connected to a link for sending information downstream to each other switch that has connectivity to an initiator socket or other upstream link.

At step 450 pipeline stages are placed within each link between switches. The pipeline stages separate combinatorial logic within each link. If the link spans a distance greater than a signal propagates within one clock cycle period, less a margin, then another pipeline stage is connected serially within the link. Further pipeline stages are inserted, as needed, such that no necessary signal need propagate further than possible within one clock cycle period, less a margin.

According to some aspects and embodiments of the invention Manhattan distances are used to calculate signal propagation distance. According to some aspects of the invention and embodiments a straight line distance is used.

In accordance with some aspects of the invention and some embodiments, aside from simply considering propagation delay, regions are also defined to segregate parts of the NoC based on clock domain. It is desirable to have single links between logic in separate clock domains in order to minimize the number of relatively expensive clock domain crossings. In such a case, regions surround parts of the chip with a common clock signal. This can be done in advance of or in conjunction with clock tree placement in a chip floorplan.

In accordance with some aspects of the invention and some embodiments, regions are defined based on power or voltage islands. It is desirable to have single links between power domains to minimize the number of relatively expensive power disconnect interfaces. In accordance with one aspect of the invention, it is desirable to have single links between voltage domains to minimize the number of relatively expensive voltage level shifters. In such cases, regions surround parts of the chip with a common power supply. This is done in conjunction with power net planning and placement.

According to some embodiments multiple switches may be defined within a region in order to ensure that if a switch is powered down it does not block data transfer connectivity between operating IPs. Furthermore, some embodiments define redundant switches to accommodate logical dependencies between multiple networks or network layers and avoid possibilities for deadlock due to traffic on shared links.

Certain IPs within chips, such as some DRAM controllers, are special. They require a dedicated link to each other region, and must have a dedicated switch that is shared with no other sockets. According to some embodiments, for each such IP, a dedicated region is drawn around its socket location such that the region encompasses no other sockets.

In accordance with one aspect of the invention and some embodiments, regions are defined that surround no sockets. The regions are placed within the physical connectivity of the NoC. This creates extra links between regions, the links ensuring a certain amount of pipelining on long routes.

Figure 5:
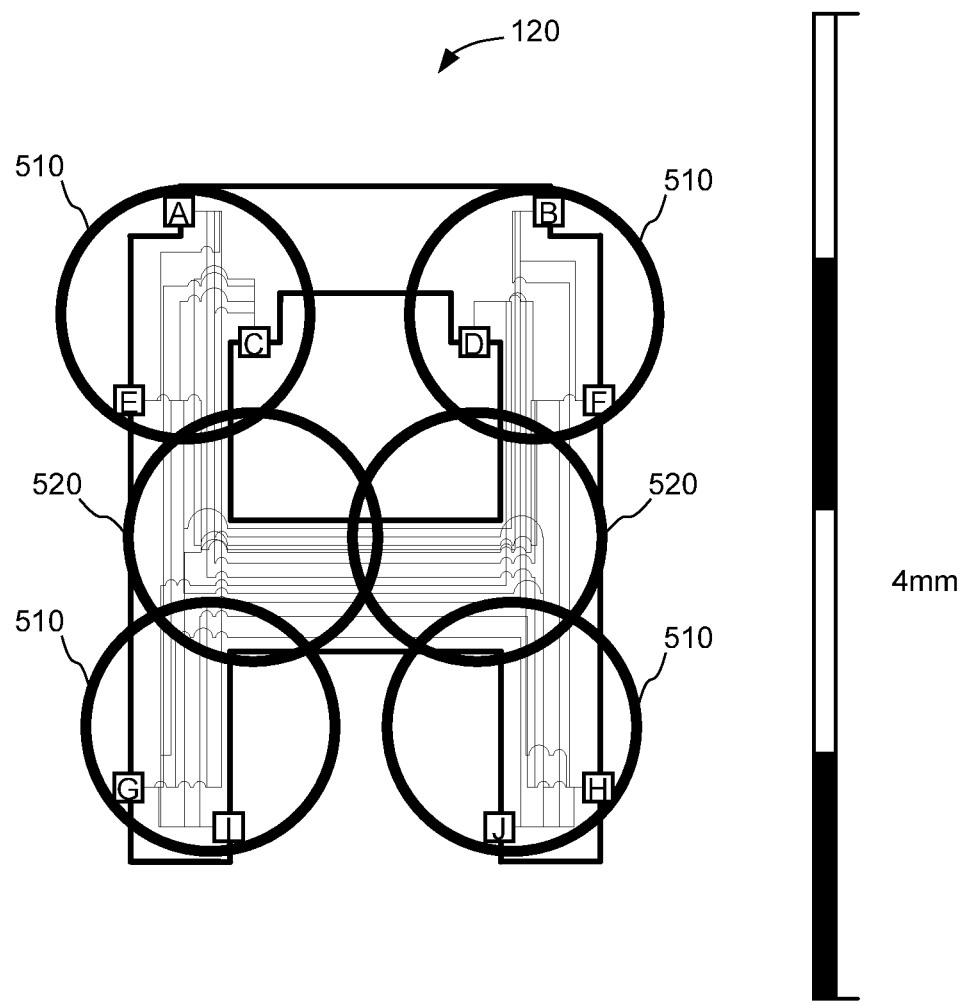
FIG. 5 shows the definition of regions within a floorplan in accordance with various aspects of the invention.

Referring now to FIG. 5, shown is routing channel 120 and the physical connectivity of FIG. 3. Additionally, according to some aspect of the invention and at least one embodiment of the invention, regions 510 are defined around clusters of localized sockets. To accommodate signal propagation distance within one clock cycle, regions are drawn with a 1 mm diameter. Additional regions 520 are drawn overlapping regions 510, such that all data transfer connectivity is implemented through physical routes that are, for all segments, encompassed by at least one region.

Figure 6:
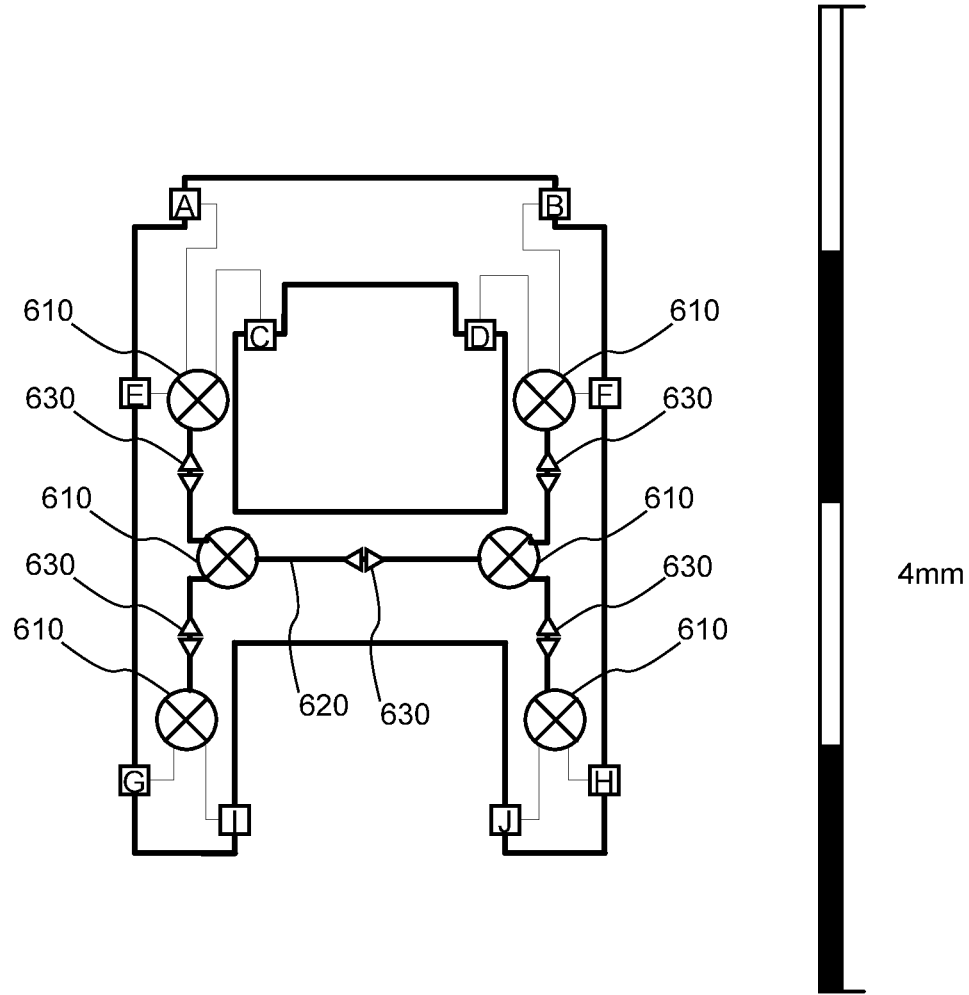
FIG. 6 shows a topology of switches connected through pipelined links within a floorplan in accordance with various aspects of the invention.

Referring now to FIG. 6, according to various aspects of the invention and at least one embodiment of the invention, a switch 610 is defined for each region 510 and 520 and located approximately within a region boundary. For clarity, the region boundary is not shown in FIG. 6. A link segment, such as link segment 620, is drawn in a heavy weight between each switch with connectivity. A link segment 620, which is drawn according to some of the embodiments of the invention, contains a single direction link. In accordance with other embodiments of the invention, the link segment 620 includes two links, each in a separate direction, or a bi-directional link.

According to some aspects of the invention, pipeline stages 630 are inserted within each link segment, such as link segment 620. According to one aspect of the invention, as in one embodiment, the pipeline stages 630 break combinational paths in the direction of data flow. According to another aspect, as in another embodiment, pipeline stages 630 break combinational datapaths in both the direction of data flow and the direction of flow control signals.

In accordance with some aspects and embodiments, regions include and are defined within a finite reference grid or otherwise such as by equations or hand drawings. In some aspects and embodiments of the invention, the NoC topology is shown and can be edited using a graphical user interface (GUI) on a display of one or more computers or computing devices. The computers or computing devices may include a central processing unit, memory, input devices (e.g., keyboard and pointing devices), output devices (e.g., display devices), and storage devices (e.g., disk drives). The memory and storage devices are computer-readable media that may contain instructions or code. In addition, the data structures and message structures may be stored or transmitted via a data transmission medium, such as a signal on a link. The computer can also use various communications protocols can may be used for transmission of, such as the Internet, a local area network, a wide area network, or a point-to-point dial-up connection. A physical view of the chip floorplan is also shown and can be edited using the GUI. Changes in one editor can cause a corresponding change to the view shown in another GUI. The topology shown in a GUI according to some embodiments allows for changes to the data width of links, insertion of pipeline stages, and insertion of storage buffers. The floorplan shown in the GUI allows for defining the physical location of IPs, hardened regions that obstruct place and route, and the physical locations of sockets and other signals related to the NoC. According to some aspects of the invention, the floorplan information is imported from a computer file, which is stored in a memory of the computer, of a standard format, such as Library Exchange Format (LEF) or Design Exchange Format (DEF). According to some aspects and embodiments of the invention, the insertion of pipeline stages within a topology is automatically computed. According to some aspects of the invention, the data width of links and storage buffering are automatically computed. According to some aspects of the invention, the decomposing of connectivity into a topology of switches is automatically computed.

Generally, chips are laid out with multiple power supply connections, each driving a network of power nets or meshes. In accordance with some aspects and embodiments of the invention, each cell within a chip has its power supply driven by exactly one power supply. It is common that chips are laid out with multiple power domains, each corresponding to the power net or mesh within a particular region of the chip. Power domains can be turned on for operation or turned off independently. In accordance with some aspects and embodiments of the invention, each power domain is driven by exactly one power supply, and so the regions of power domains are exclusive subsets of the regions of power supplies.

Generally, chips are laid out with multiple clock sources, each driving a network of clock signal nets or meshes within a particular region of the chip. Clock domains are essentially always subsets of voltage regions, but not necessarily exact regional subsets of power domains. In other words, a clock net may cross between regions of different power domains. In such a case, the portion of the clock net in each power domain is treated by some embodiments as a separate clock net.

The following is an iterative hierarchical clustering algorithm for automating the generation of an optimal switch topology for a NoC according to some aspects of the invention as captured in one embodiment.

1. Group sockets by clock domain. Clock domain grouping is the fundamental first level of sorting because all logic of a switch must operate from the same clock net such that its logic is clocked and powered monolithically.

Figure 7:
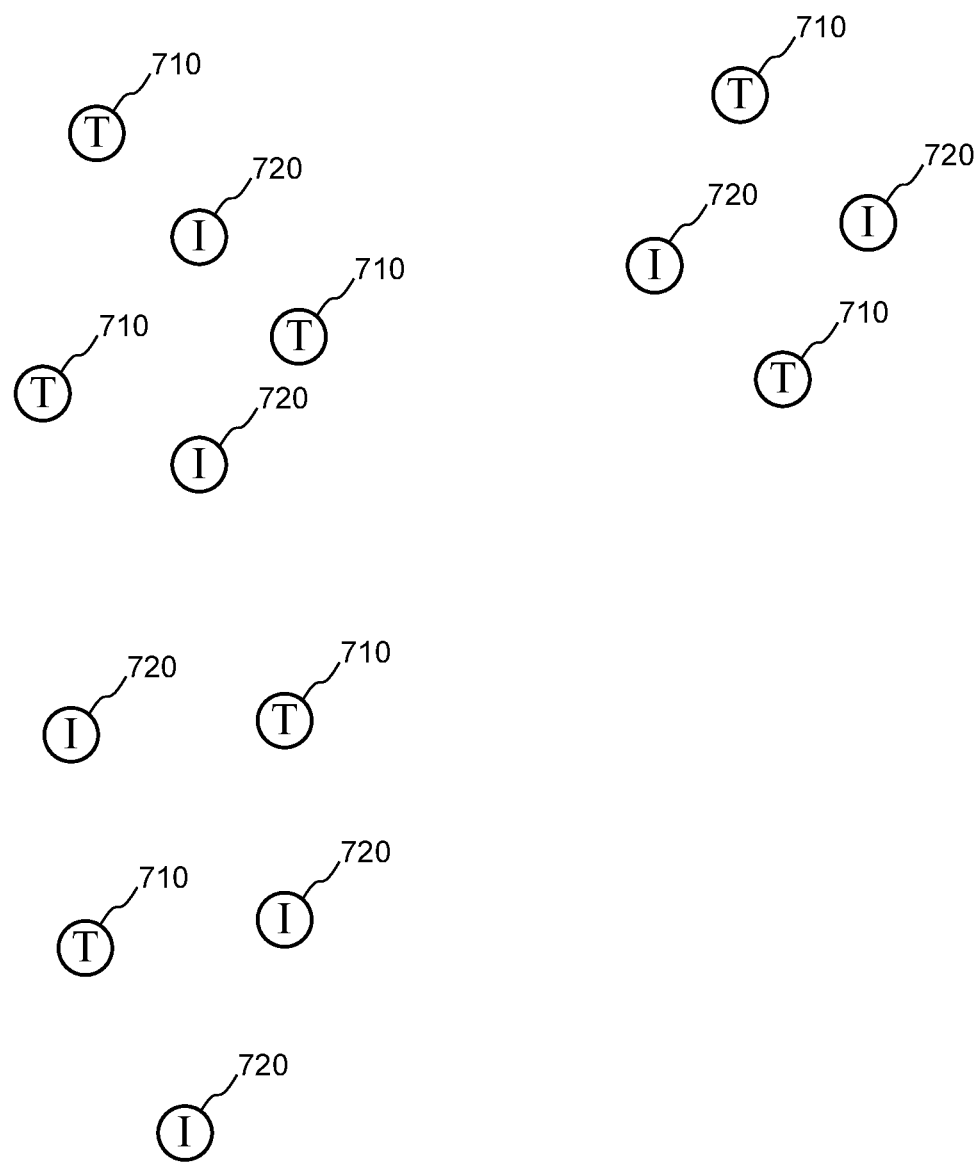
FIG. 7 shows physical locations of target sockets and initiator sockets of a clock domain within an unobstructed floorplan in accordance with various aspects of the invention.
Figure 8:
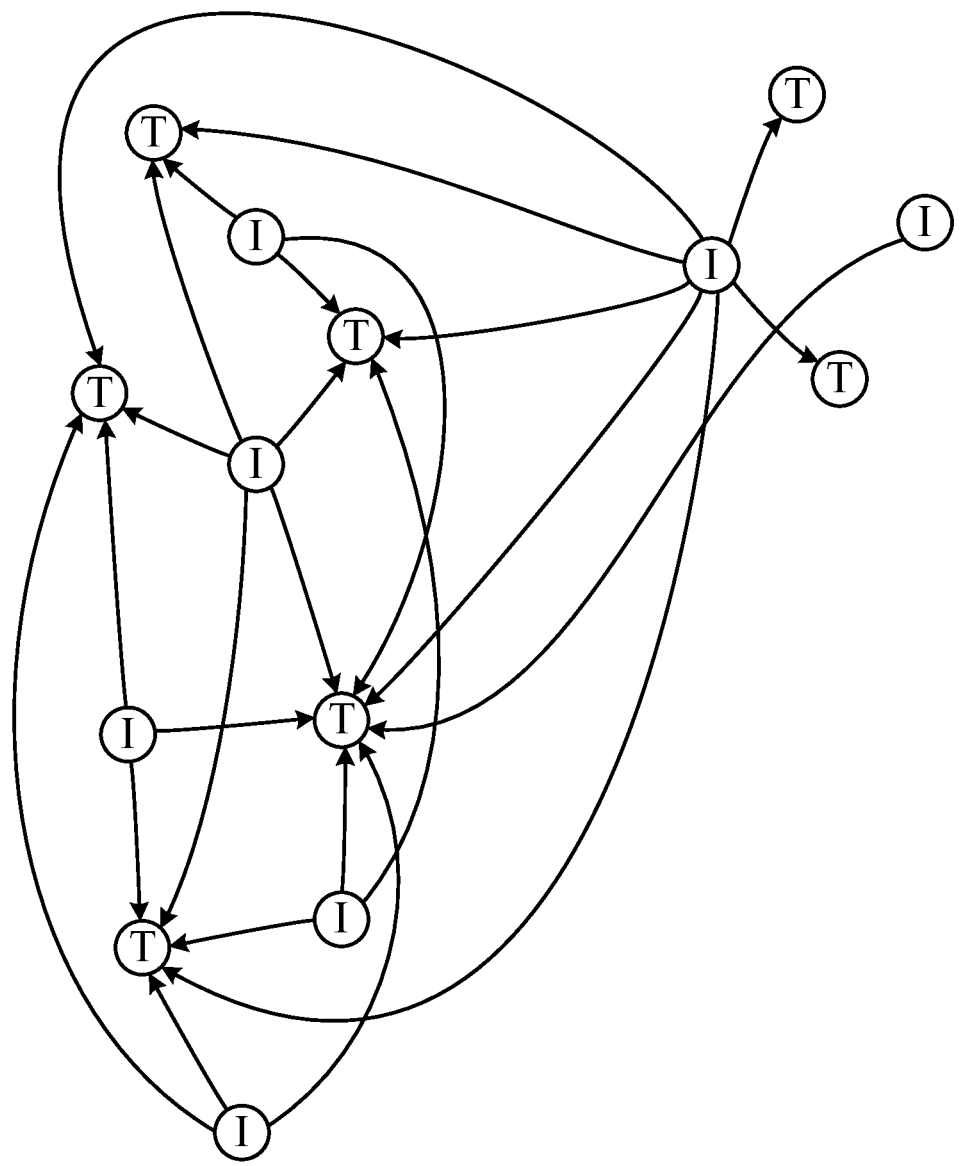
FIG. 8 shows the data transfer connectivity between the initiator sockets and target sockets of FIG. 7 in accordance with various aspects of the invention.

Referring now to FIGS. 7 and 8, FIG. 7 shows physical locations of seven target sockets 710 and seven initiator sockets 720 of a clock domain within an unobstructed floorplan. FIG. 8 shows the data transfer connectivity between initiator and target sockets.

2. For each clock domain group sockets into clusters based on proximity. There are generally multiple possible combinations of sockets into clusters that meet constraints, and countless ways to determine the cluster groupings. The optimal way for any given embodiment is dependent on second order effects. In any case, clusters must satisfy the property that the most distant sockets in each cluster are within a particular distance of each other. The particular distance is generally based on the maximum signal propagation distance within a clock cycle period, including a certain amount of margin. There are numerous ways to calculate distance, three ways being Euclidian distance, Manhattan distance, and sparse mesh reference grid increments.

In some embodiments, the calculation of distance accounts for obstructions. The locations of sockets and the locations, sizes, and shapes of obstructions can be defined multiple ways such as by numerical descriptions of point coordinates or graphically such as in the GUI of a computer program. According to some aspects and embodiments, a table of distances between objects is formulated. The distances are calculated, including distance between objects accounting for routing around obstructions. One algorithm for calculating such distances is Dijkstra's algorithm. Objects in such a table include sockets, but also clusters, accounting for the most distant sockets between any given pair of clusters.

According to some aspects and embodiments the assignment of sockets to clusters is performed as follows:

a. Sort sockets by the number of connections within the distance. According to some aspects and embodiments, the list is sorted from the minimum to maximum. According to some aspects and embodiments, the list is sorted from maximum to minimum. Other methods of sorting are possible.

b. For each socket, if it is not assigned to a cluster, create a new cluster, assign the socket to the cluster, and assign all other connected sockets within the distance to the same cluster.

Figure 9:
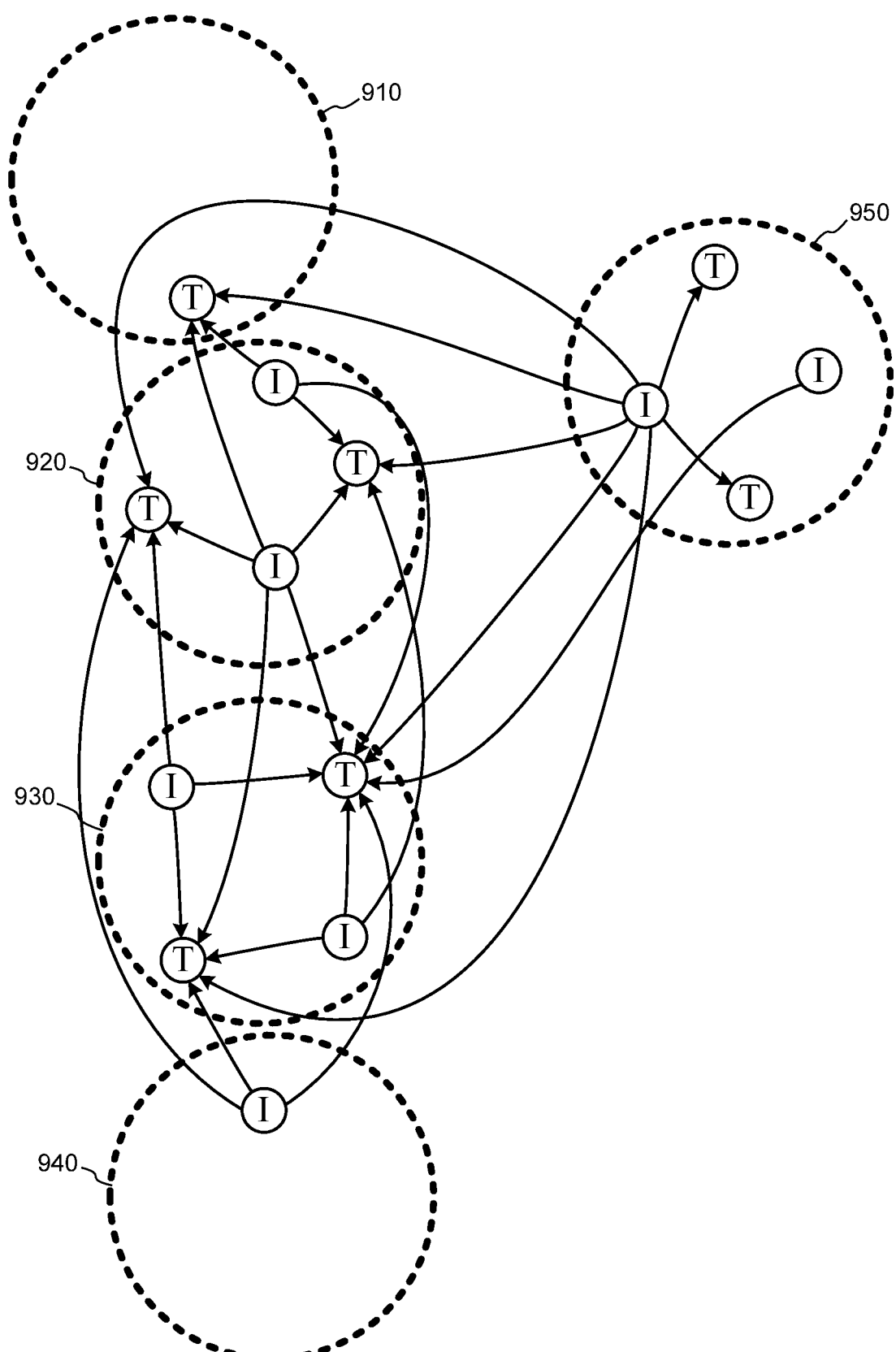
FIG. 9 shows grouping of a set of clusters of the sockets of FIG. 7 in accordance with various aspects of the invention.

In accordance with various aspects of the invention, one way to determine clustering is by using a skeletonization algorithm. Referring now to FIG. 9, in accordance with various aspects of the invention, FIG. 9 shows grouping of a set of clusters 910, 920, 930, 940, and 950 of the sockets 710 and 720.

3. Optionally, further sub divide clusters based on data path serialization. In some aspects and embodiments this is done before or after step 2. Creating switches with different data path serializations is possible, but requires the use of serialization adapter units. Since a switch can have much connectivity, such units would have to be instantiated many times, costing area and timing delay. By grouping sockets into clusters so that cluster switches only contain a single serialization, serialization adapter units are needed only on links between switches.

4. Determine connectivity within and between clusters. If a cluster could be subdivided into sub clusters, between which there is no connectivity, then that subdivision should be done. In some aspects and embodiments this is done before step 2, as knowing the connectivity could be used to guide the proximity grouping.

Figure 10:
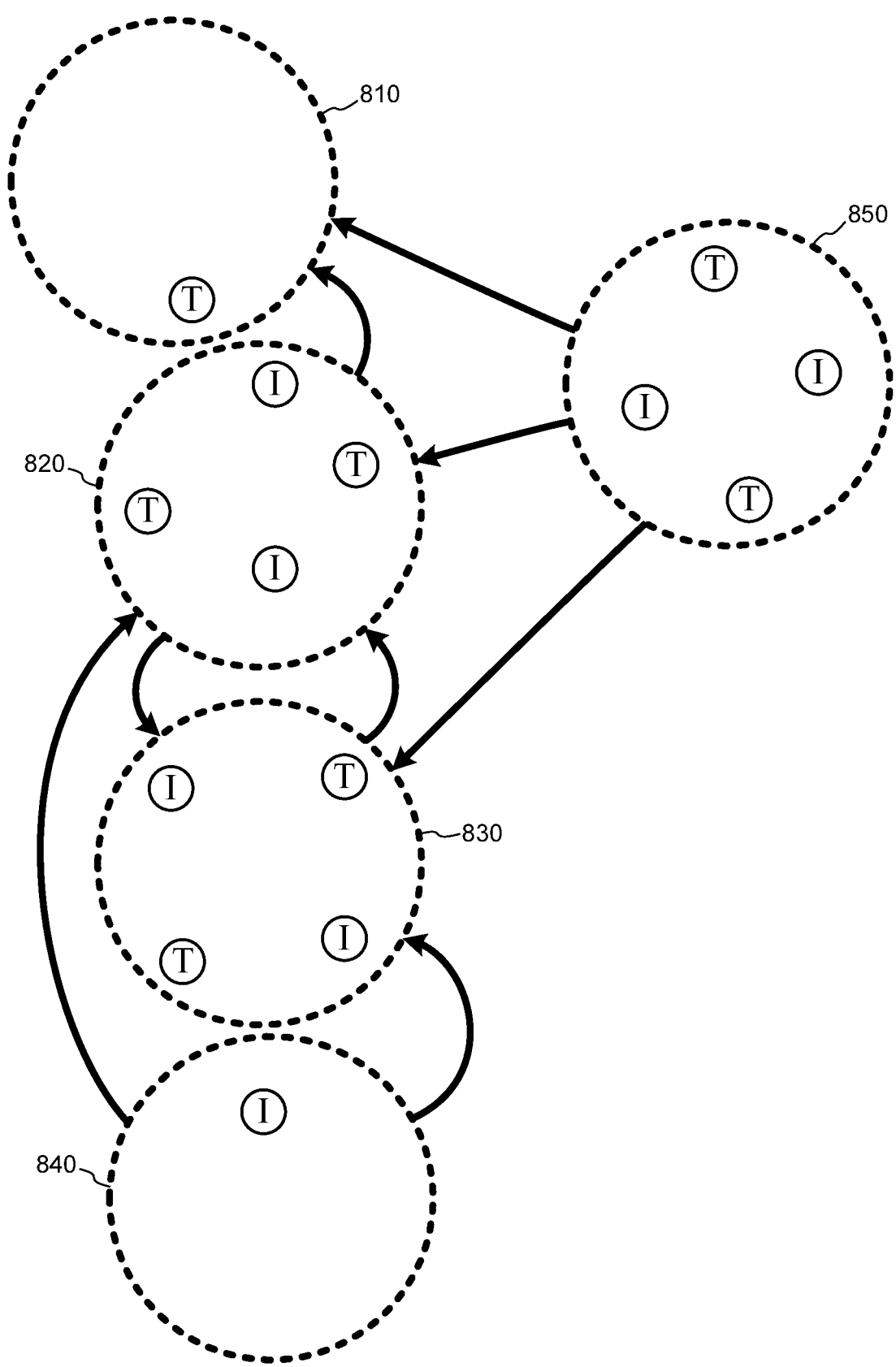
FIG. 10 shows the connectivity between clusters based on the data transfer connectivity of the sockets of FIG. 7 in accordance with various aspects of the invention.

Referring now to FIG. 10, in accordance with various aspects of the invention, FIG. 10 shows the connectivity between clusters 910, 920, 930, 940, and 950, derived from the connectivity of the sockets 710 and 720.

5. Define a switch for each cluster. The switch has a receive (Rx) port for each initiator socket and each other cluster with connectivity to the cluster if the other cluster has at least one initiator socket. The switch has a transmit (Tx) port for each target socket and each other cluster with connectivity to the cluster if the other cluster has at least one target socket.

By thusly sharing connectivity through a localized switch, approximately duplicative routes through the chip floorplan are significantly fewer. As a result, the topology of switches is significantly improved for chip physical design. However, independent routes from close switches to a common distant switch still form approximately duplicative routes.

6. Create a new level of clusters by grouping sub-level clusters based on proximity. In accordance with some aspects of the invention, this is done in a similar manner as the grouping of sockets done in step 2. Grouping is done based on the maximum signal propagation distance within a greater number of clock cycles than the sub-level clustering. If the signal propagation distance could encompass all sub clusters then the grouping is complete.

Figure 11:
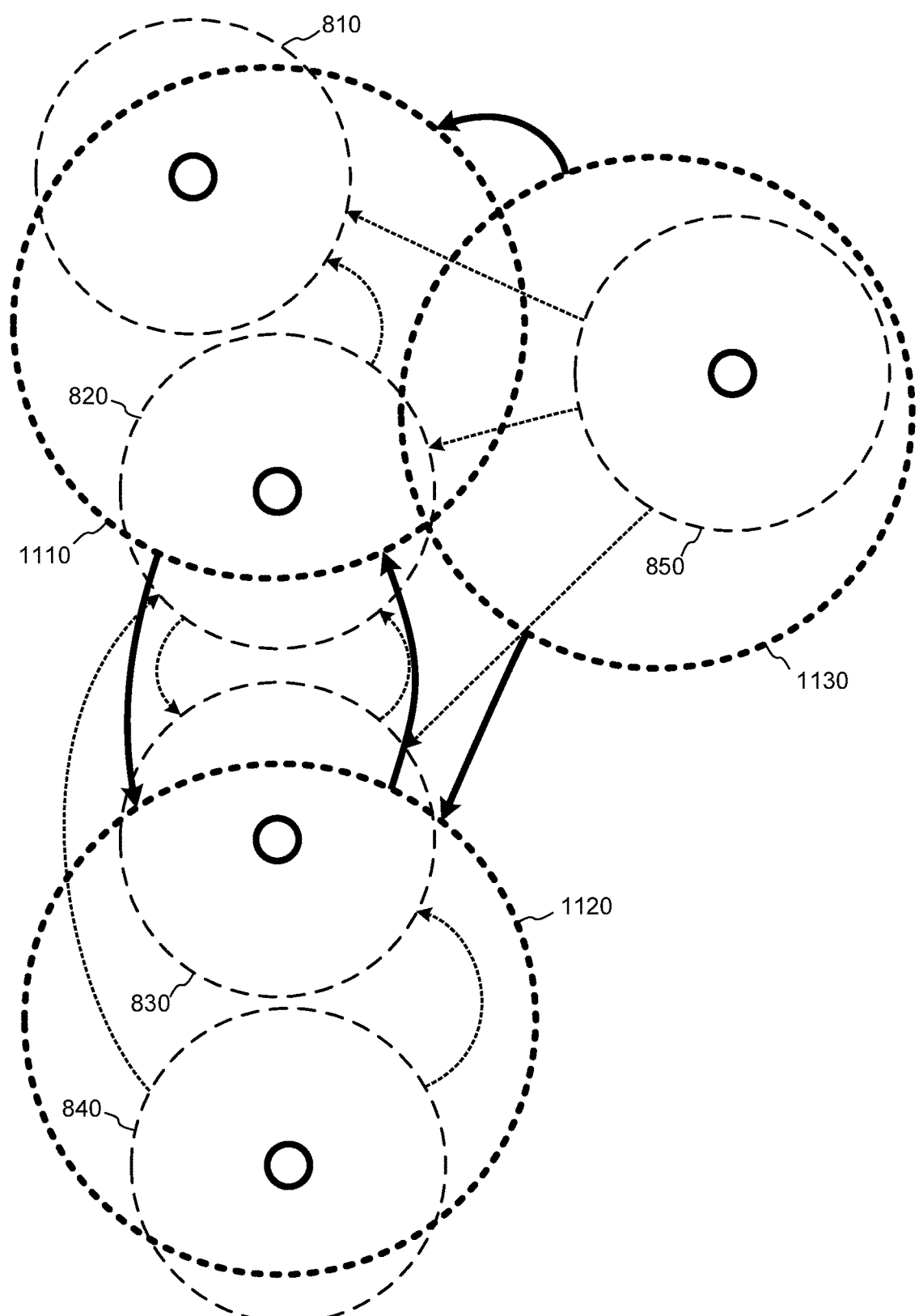
FIG. 11 shows new level clusters that encompass clusters of FIG. 8 in accordance with various aspects of the invention.

FIG. 11 shows new level clusters 1110, 1120, and 1130 in accordance with some aspects of the invention. New level cluster 1110 encompasses sub-clusters 910 and 920. New level cluster 1120 encompasses sub-clusters 930 and 940. New level cluster 1130 encompasses sub-cluster 950.

7. Define a switch for each new level cluster. In accordance with some aspects of the invention, the switch has a Rx port for each sub cluster that sends data and a Tx port for each sub cluster that receives data. Repeat steps 6 and 7 until the cluster grouping is complete.

Figure 12:
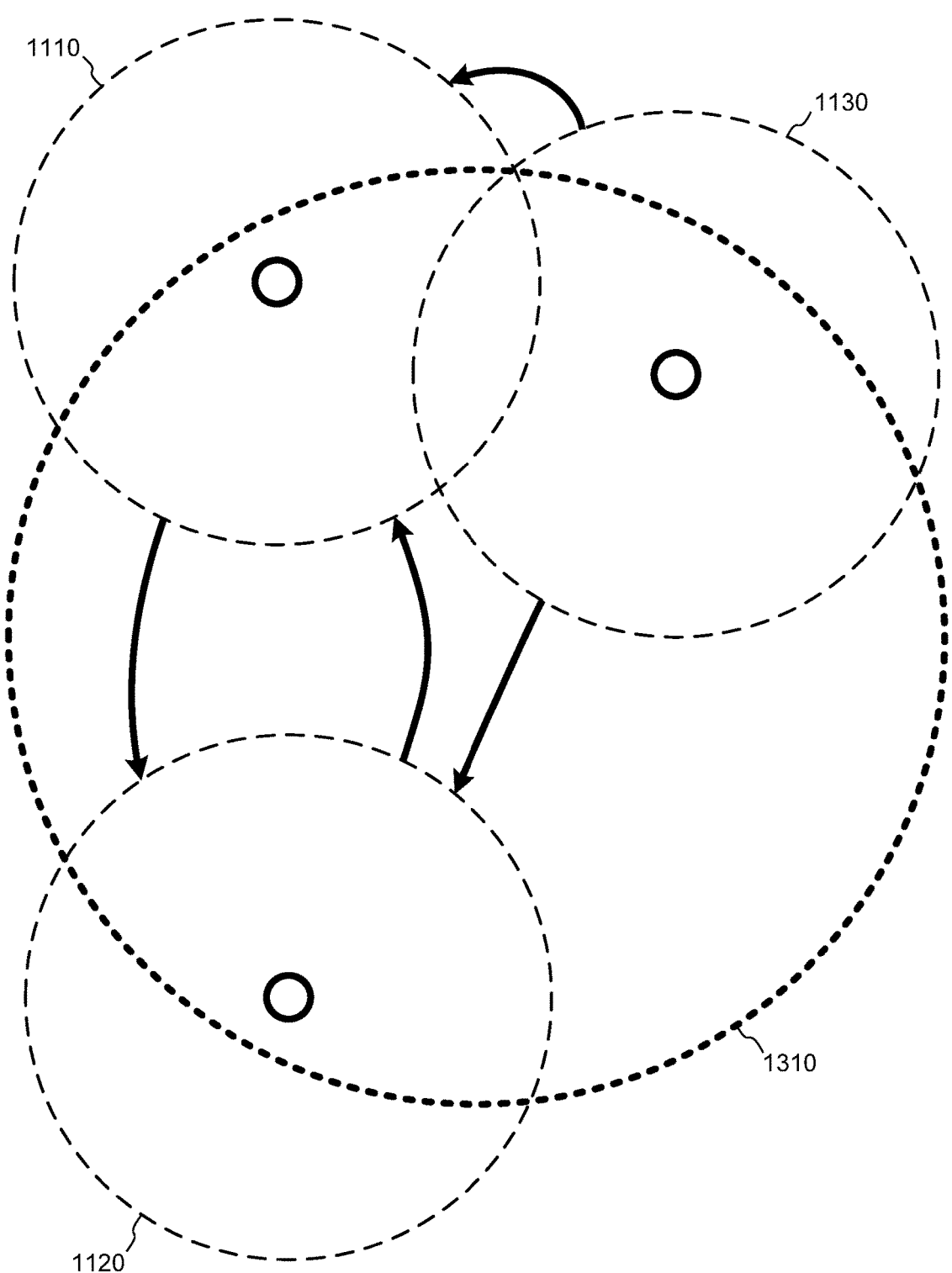
FIG. 12 shows new level cluster above the clusters of FIG. 11 in accordance with various aspects of the invention.

FIG. 12 shows new level cluster 1210 above clusters 1110, 1120, and 1130. Since new level cluster 1210 encompasses all sub-clusters, the cluster grouping process is complete.

8. Optionally, assign a serialization to each link in the NoC. Each connection between a socket and a port (Rx or Tx) and each connection between an Rx and Tx port comprises is a link. Link serialization defines a data width and, in some embodiments, an arrangement of header information spatially or temporally relative to data information of packets. Insert serialization adapters at links as needed.

The decision of the link serialization is based on the amount of throughput needed at the link. In different use cases the link is likely to have different throughput requirements. The link serialization should be as small as possible to minimize wire routing congestion but must be large enough to accommodate the greatest amount of throughput at its point in the topology for all of a number of use case scenarios.

The greatest throughput at each link point in the topology for a use case scenario is the aggregate sum of the bandwidth between each initiator and target socket that have data transfer connectivity through the link at each moment in time during the access patterns of the scenario.

In some aspects and embodiments the greatest throughput requirement is calculated with knowledge of the effect of link serialization throttling on QoS and the QoS requirements of the initiator sockets that have data transfer connectivity through the link. In other aspects and embodiments the greatest throughput requirement is determined through simulations of traffic patterns.

9. Optionally and in accordance with some aspects of the invention, remove latency-critical routes from switches. Some socket connections are particularly sensitive to latency. One example is the route from CPU to DRAM, which is particularly critical to software performance in many chips. Each switch adds latency to the communication path between sockets. By removing latency-critical routes from switches, additional duplicative routing channels are consumed, but for the benefit of better chip performance. The low latency routes can be simply removed from intermediate switches or can be routed through a different layer or a different network.

10. Optionally and in accordance with some aspects of the invention, remove sockets for special IPs from switches. DRAM controllers are a special IP in many chips because they are central in the topology and critical to overall chip performance. DRAM controllers and other special IPs can benefit from their sockets being isolated from other sockets on a common switch so as to avoid traffic congestion in the switch due to backpressure from other downstream destinations.

Figure 13:
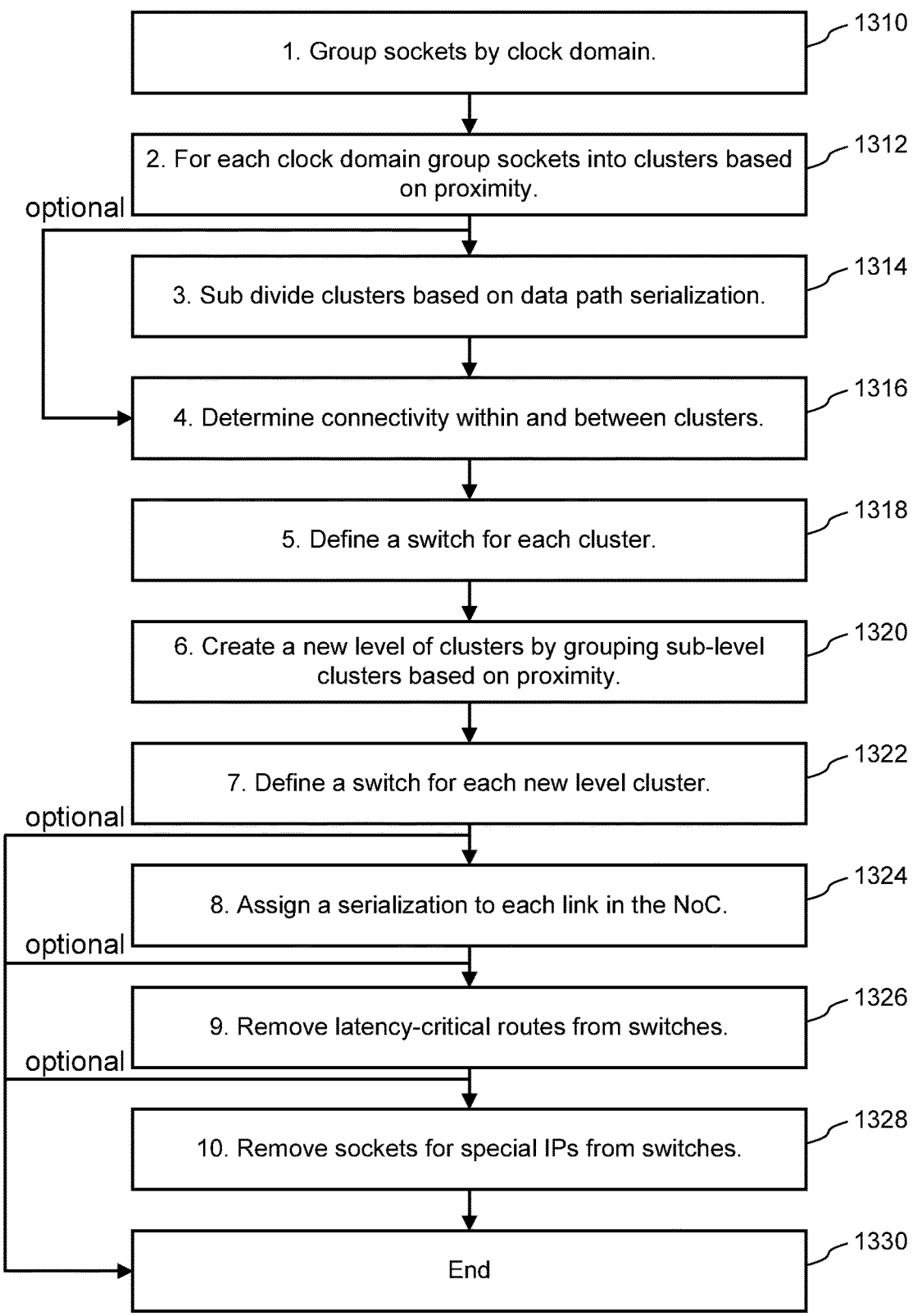
FIG. 13 shows the steps of an embodiment of NoC topology generation in accordance with various aspects of the invention.

The steps of the embodiment described above are shown in FIG. 13. Step 1310: group sockets by clock domain. Step 1312: for each clock domain group sockets into clusters based on proximity. Step 1314: optionally sub divide clusters based on data path serialization. Step 1316: determine connectivity within and between clusters. Step 1318: define a switch for each cluster. Step 1320: create a new level of clusters by grouping sub-level clusters based on proximity. Step 1322: define a switch for each new level cluster. Step 1324: optionally assign a serialization to each link in the NoC. Step 1326: optionally remove latency-critical routes from switches. Step 1328: optionally remove sockets for special IPs from switches. Step 1330: end.

Some aspects and embodiments of the invention use an incremental switch creation algorithm for automating the generation of a switch topology for a NoC. The elements of such an algorithm are initiator sockets, target sockets, switches, pipeline stages (pipes), routes, and segments. A route is a logical connections of one initiator sockets and one target sockets. Initiator sockets send requests to target sockets. Switches make logical and physical combinatorial connections between sockets and pipes. Combinatorial logic dependencies exist within a switch between all connected sockets and pipes, regardless of whether there is data transfer connectivity. This is because a physical Valid signal from an upstream object can determine the value of a Ready signal to any other upstream object. A pipe breaks all combinatorial paths on routes that pass through the pipe. Connections between objects are known as segments. An incremental switch creation algorithm, according to various aspects of the invention, is as follows.

1. Accept as input:
   a. A distance that a signal can propagate along a wire within the time period of one clock cycle.
   b. A logic delay time period for at least one type of logic gate.
   c. A list of at least one initiator sockets, an x and y coordinate of their location within a floorplan, and an estimated logic delay for each socket.
   d. A list of at least one target sockets, an x and y coordinate of their location within a floorplan, and an estimated logic delay for each socket.
   e. A list of any number of obstructions, defined as polygons.
   f. A list of routes and a bandwidth requirement for each route.
2. Create a table of segments, one for each route.
3. For each segment, calculate the region in which a commonly-connected switch can exist such that the sum of the distances from the endpoints of the segments to the switch is less than the distance, if such a region exists. Note that, as taught by 17th century mathematician Johannes Kepler, the shape in which the distance between two points is a constant is an ellipse.

That is at least true when Euclidean distances are calculated in a Cartesian coordinate space. When Manhattan distances are calculated, as is common in the routing of wires within chips, the shape is an octagon that is rotationally aligned to horizontal and vertical Cartesian coordinates.

Figure 14:
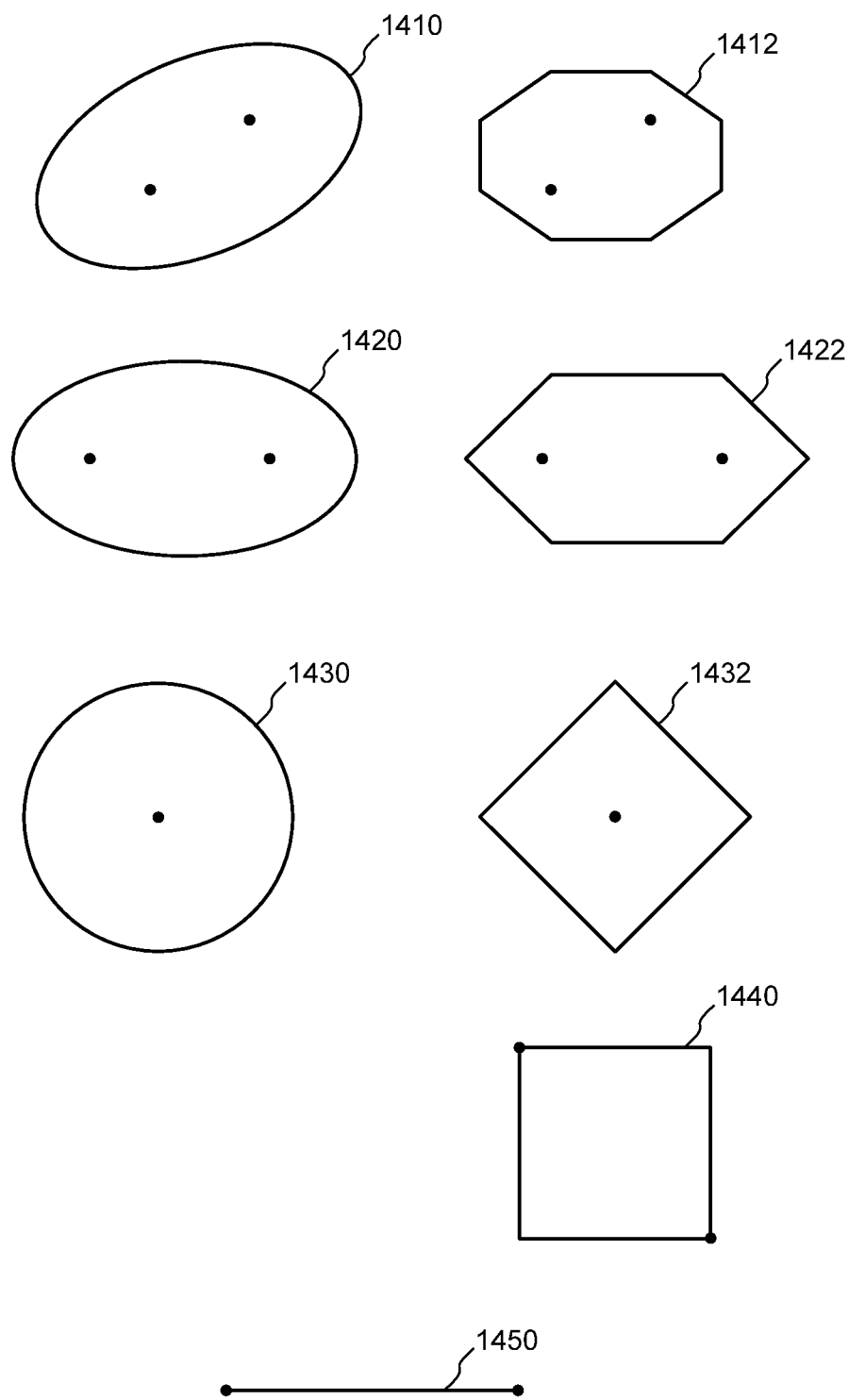
FIG. 14 shows examples of Euclidian and Manhattan ellipses in accordance with various aspects of the invention.

Referring now to FIG. 14, in accordance with the aspects of the invention, FIG. 14 shows Cartesian ellipse 1410 and Manhattan ellipse 1412. In the special case that the two points are vertically aligned or horizontally aligned, as in 1420, two opposing sides of the octagon have zero length and so the region is hexagonal, as in 1422. In the special case of a single point (or two points that are coincident), as in 1430, then two sets of two opposing sides of the octagon have zero length and so the shape is a square with 45 degree rotation for the Cartesian coordinate system, as in 1432. In the special case that the distance between the two points are equal to the distance that a signal can propagate, then the region is a square, rotationally aligned to the coordinate system, as in 1440. In the special case that the segment endpoints are aligned in a dimension and their distance is equal to the distance that a signal can propagate, then the region is a single line, as in 1450, whether in Cartesian or Manhattan space.

That is true when no obstructions are present. If obstructions are present within the space then the region is a subset of the Manhattan ellipse. Note, however, that the region might not be a simple subset of the Manhattan ellipse with the overlapping portion of the obstruction removed. Obstructions can cast shadows of unreachable area within a Manhattan ellipse. Shadows are formed when an ellipse focus has no line-of-sight access to a corner of an obstruction. In that case, a shadow is cast from the furthest edge of the Manhattan ellipse on the side of the obstruction away from the focus and the edge of the shadow extends at 45 degrees until it meets another boundary.

According to some embodiments, calculations are based on a single time-distance. In other embodiments, different times and distances are used to define signal propagation horizons. Each unit has an amount of logic delay. It decreases the amount of time-distance available in a clock cycle period for signal propagation. Since data transfer requires a ready/valid signal handshake between units, combinatorial logic paths will traverse the physical distance between units twice; once in each direction. That means that each unit location has a logic horizon, which is a circle with a radius of ½ of the available clock cycle period. Any two units with connectivity have a logic horizon overlap if they are within the distance of each other's logic horizon. Note that in Manhattan space a region of logic overlap is a rectangle with a 45 degree offset to the coordinate system.

A signal can travel from a unit to a distant register, such as a pipeline stage, over a distance equal to one clock cycle since there is no round-trip combinatorial handshake. Therefore, each node has a register horizon equal to a ½ clock cycle extension beyond a region of logic overlap. For pipeline stages with connectivity to any two units, if the units are sufficiently close, they have a register horizon overlap region.

As will be apparent to those of skill in the art upon reading this disclosure, each of the aspects described and illustrated herein has discrete components and features, which may be readily separated from or combined with the features and aspects to form embodiments, without departing from the scope or spirit of the invention. Any recited method can be carried out in the order of events recited or in any other order which is logically possible.

Unless defined otherwise, all technical and scientific terms used herein have the same meaning as commonly understood by one of ordinary skill in the art to which this invention belongs. Any methods and materials similar or equivalent to those described herein can also be used in the practice of the invention. Representative illustrative methods and materials are also described.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein.

In accordance with the aspects and teachings of the invention a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor, in turn, executes the computer readable program code to create or amend an existing computer-aided design using a tool. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Accordingly, the preceding merely illustrates the various aspects and principles as incorporated in various embodiments of the invention. It will be appreciated that those of ordinary skill in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Therefore, the scope of the invention, therefore, is not intended to be limited to the various aspects discussed and described herein. Rather, the scope and spirit of invention is embodied by the appended claims.

What is claimed is:

1. A method of configuring a network-on-chip, the method comprising:
    defining a data transfer connectivity of a plurality of IP (intellectual property) sockets; defining a location for each of the plurality of IP sockets;
    defining a distance, such that a signal propagates less than the distance within an amount of time;
    defining a set of switches, such that at least one switch is selected from the set of switches within the distance of each of the plurality of IP sockets;
    defining a coupling between each of the plurality of IP sockets and the at least one switch; and
    defining a coupling between two switches from the selected set of switches, the coupling providing for the data transfer connectivity.

2. The method of claim 1 wherein the amount of time is less than a clock cycle period.

3. The method of claim 1 wherein at least one switch selected from the set of switches is coupled to more than one IP socket.

4. The method of claim 1 wherein at least one switch selected from the set of switches is coupled to more than four other switches.

5. The method of claim 1 wherein each location is defined on a reference grid.

6. The method of claim 1 further comprising defining a pipeline stage within the coupling of two switches.

7. The method of claim 1 further comprising:
    removing at least one coupling between one of the plurality of IP sockets and the at least one switch of the set of switches; and
    defining a coupling between the IP socket and a second switch of the set of switches.

8. The method of claim 1 further comprising associating a distinguishing color with each of a plurality of regions.

9. The method of claim 1 further comprising:
    defining a module; and
    defining at least one switch selected from the set of switches as being within the module.

10. The method of claim 1 wherein at least one IP socket is coupled to a DRAM controller.

11. The method of claim 1 further comprising simulating performance of the network-on-chip for a defined traffic pattern.

12. The method of claim 1 further comprising defining a data width of at least one coupling.

13. The method of claim 1 further comprising defining a storage buffer within at least one coupling.

14. A non-transitory computer readable medium comprising instructions for execution by a processor, wherein the instructions cause the processor to:
    define a data transfer connectivity of a plurality of IP (intellectual property) sockets;
    define a location of each of the plurality of IP sockets;
    define a distance, such that a signal propagates less than the distance within an amount of time;

define a set of switches, such that a switch is selected from the set of switches within the distance of each of the plurality of IP sockets;
define a coupling between each of the plurality of IP sockets and the at least one switch; and
define a coupling between two switches from the selected set of switches, the coupling providing for the data transfer connectivity.

* * * * *